Sept. 2, 1924.  1,507,344

G. H. DOERING

TRAP FISHHOOK

Filed July 3, 1922

INVENTOR
George H. Doering
BY
ATTORNEYS

Patented Sept. 2, 1924.

1,507,344

UNITED STATES PATENT OFFICE.

GEORGE H. DOERING, OF BROOKLYN, NEW YORK.

TRAP FISHHOOK.

Application filed July 3, 1922. Serial No. 572,565.

*To all whom it may concern:*

Be it known that I, GEORGE H. DOERING, a citizen of the United States, and resident of the borough of Brooklyn, in the county of Kings, city and State of New York, have invented new and useful Improvements in Trap Fishhooks, of which the following is a specification.

This invention relates to improvements in trap hooks for use in catching fish, and has for its objects to provide a simple and inexpensive trap hook which may be readily set, is not likely to get out of working condition because of corrosion or rust, and is substantially "weedless." A further object of the invention is to provide a simple and efficient trigger device for holding the jaws or gaffs in set position and limiting the swinging movement of the gaffs toward each other.

To the foregoing and other ends, which will hereinafter appear, the invention consists in the features of construction, arrangements of parts, and combinations of elements set forth in the following description and particularly pointed out in the appended claims.

Figure 1:
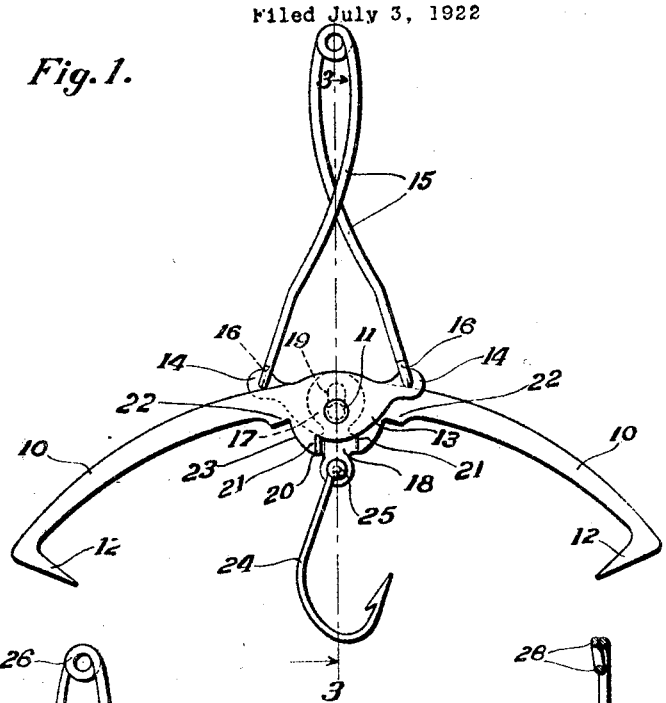
Figure 2:
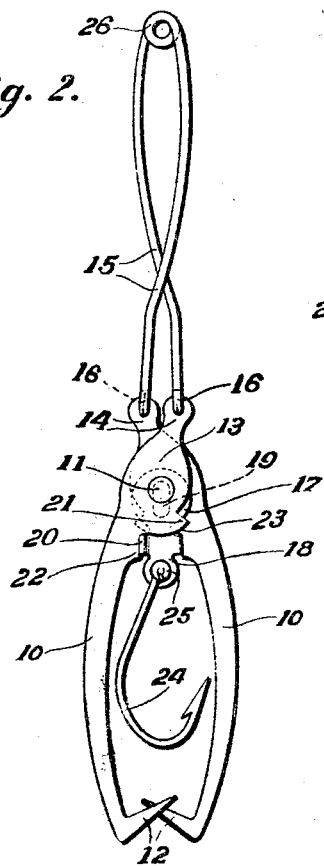
Figure 3:
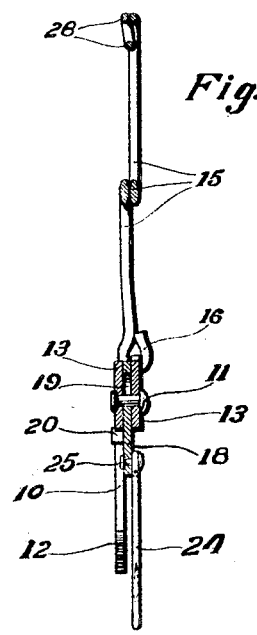

In the accompanying drawings, in which a trap hook embodying the invention in its preferred form is illustrated:

Figure 1 is a side elevation of the trap hook in "set" position;

Fig. 2 a side elevation of the trap hook in "sprung" or tripped position;

Fig. 3 a sectional view on the line 3—3 of Fig. 1; and

Figure 4:
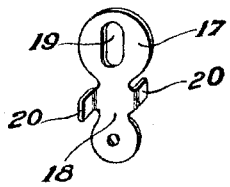

Fig. 4 a detail perspective view of the trigger plate.

Referring to the drawings by numerals 10 designates the two gaffs or gripping hooks which cross each other near their upper ends and are pivotally connected at the point of intersection by a rivet or other suitable pivot pin 11 so that the lower arms or portions of the gaffs may swing toward and from each other in parallel planes. The gaffs 10 are preferably formed of sheet steel stampings and are provided at their lower ends with integral inwardly extending hooks or penetrating prongs 12. The hook-carrying arms of the gaffs are preferably bowed outwardly, as shown, and said gaffs are widened adjacent the pivot point as indicated at 13.

The short upper arms 14 of the gaffs are connected by a suitable spring 15 which normally tends to swing the gaffs about the pivot 11 in a direction to force the hook ends 12 inwardly toward each other. Spring 15 preferably comprises a length of resilient wire coiled midway its ends to form a line-attaching eye 26 and having the arms thereof which extend downward from said eye crossed and passed at their lower ends through apertures in arms 14 of the gaffs, the lower ends of the spring arms being bent upon themselves after passing through the arms 14, as shown at 16, to prevent separation of the spring from the gaffs.

The enlarged upper end 17 of a relatively short trigger plate 18 is interposed between the enlarged or widened intersecting portions 13 of the two gaffs 10, said enlarged end of the trigger plate being provided with a short vertically extending slot 19 through which the pivot pin 11 extends, whereby said plate may slide and swing relatively to the gaffs. The enlarged end 17 of the trigger plate provides a substantial bearing surface for the gaffs around the pivot so as to resist canting of the gaffs and prevent injurious strains on the heads of the rivet 11. The trigger plate 18 is preferably formed of aluminum-bronze or other suitable metal which will not rust or corrode and, as said plate is interposed between the two steel gaffs where said gaffs cross at their pivots, sticking of the gaffs owing to rust or corrosion is prevented. The pivot pin or rivet 11 is also preferably formed of similar rust-proof material. Quick and easy action of the gaffs is thus insured at all times.

The trigger plate 18 is preferably formed by stamping from sheet metal and is provided substantially midway its ends at opposite edges thereof with two integral stop lugs 20 bent at right angles to the plane of the plate and extending in opposite directions. Each gaff 10 is formed with two stop shoulders 21 and 22 below and adjacent the pivot 11 at the inner edge of the gaff, the inner edge of the enlarged portion 13 of the gaff between the upper end of stop shoulder or abutment 22 and the lower end of stop shoulder or abutment 21 being curved on an arc struck from the pivot point 11 of the gaffs so that said curved edge 23 of each gaff may ride freely over the upper edge of the adjacent stop lug 20 during the opening and closing movement of the gaffs.

The shank of a suitable bait-hook 24 is secured at its upper end to the lower end of the trigger plate 18. I prefer to arrange the hook 24 as shown so as to provide a flat construction of trap hook in which the gaffs and bait hook are located in closely adjacent parallel planes. As shown hook 24 is located in the same plane as one of the gaffs and is rigidly secured to the trigger plate by a rivet 25 which passes through an eye at the upper end of the shank of the hook and an aperture in the trigger plate, said rivet being preferably hammered to clamp the hook tightly to the plate so that said hook can not swing relatively to the plate It will be observed from Fig. 3 that spring 15 is located in vertical alignment with the gaffs and bait-hook so that a flat construction is provided.

To set the trap hook, the gaffs are swung outwardly as shown in Fig. 1 until shoulders 21 are spaced apart sufficiently to permit stops 20 to be passed upward between said shoulders, whereupon plate 18 is pushed upward until stop lugs 20 engage the shoulders 21. When the trap hook is set the spring 15 holds shoulders 21 tightly against stops 20 and, as said shoulders and stops are relatively long vertically, accidental tripping or release of the trap is avoided. The trap is adapted to be tripped or released by a pull on the bait hook 24 which will cause a downward sliding movement of the trigger plate until stops 20 are withdrawn from contact with shoulders 21, whereupon spring 15 will snap the hooked lower ends of the gaffs inwardly and cause gaff points 12 to penetrate the fish.

Stop lugs 20 are adapted to engage the stop shoulders 22 to limit the inward movement of the gaffs when the trap is sprung and to hold the parts in the position shown in Fig. 2 when the device is not in use or is packed for transportation. It will be observed that the device is so constructed that it may be packed and carried in flat form thus reducing liability of breakage of the parts and permitting compact arrangements of the devices in boxes or on cards for shipments in lots. It will also be observed that no springs or parts liable to be put out of working order by corrosion or rust are employed, that all of the parts are of substantial and strong construction, and that the several parts are simple in form and easy to make and assemble. It will be further seen that in trolling or drawing the device through the water the trigger plate and bait hook are protected by the gaffs from striking weeds, logs, etc., and accidently springing the trap hook. The entire tripping means is at the rear of the leading edges of the spread gaffs so that the device will ride over logs, rocks, etc. without danger of tripping. If drawn through weeds, the bowed gaffs will spread the weeds and the trigger mechanism will pass without being tripped.

What I claim is:

1. In a device of the class set forth, the combination of a pair of crossed gaffs, a pivot pin extending through said gaffs at their point of intersection, said gaffs having inwardly turned gaff-points at one end, a spring connecting the opposite ends of the gaffs normally tending to force the gripping ends of the gaffs toward each other, a trigger interposed between the opposed faces of the gaffs around the point of pivotal connection, the said trigger having a longitudinal slot through which said pivot pin extends, a pair of stop projections extending in opposite directions transversely of the planes of the trigger and gaffs and carried by said trigger, said gaffs having abutments adapted to be engaged by the stops on the trigger to hold the gaffs in set position against the tension of said spring when the trigger is moved longitudinally in one direction and to be disengaged when the trigger is moved in the opposite direction, and a bait hook attached to said trigger and located between the gaffs.

2. In a device of the class set forth, the combination of a pair of flat crossed sheet metal gaffs, a flat sheet metal trigger-plate having one end located between the gaffs at their point of intersection and spacing the opposed faces of the gaffs apart at said point, a bait hook attached to the other end of said trigger plate, said trigger plate having a longitudinal slot therein adjacent its upper end and being provided with a pair of oppositely extending stop lugs formed integrally therewith at opposite edges thereof and bent at right angles to the plane of said plate and gaffs, a pivot pin extending through the gaffs and said slot in the trigger plate, and a spring normally urging the pointed ends of the gaffs toward each other and attached at its ends to the other ends of the gaffs, said gaffs having stop shoulders formed on the inner edges thereof between which the stop lugs on the trigger plate are shiftable by a sliding movement of the plate in one direction to hold the pointed ends of the gaffs spaced apart against the action of said spring.

3. In a device of the class set forth, the combination of a pair of flat crossed sheet metal gaffs, a flat sheet metal trigger-plate having one end located between the gaffs at their point of intersection and spacing the opposed faces of the gaffs apart at said point, a bait hook attached to the other end of said trigger plate, said trigger plate having a longitudinal slot therein adjacent its upper end and being provided with a pair of oppositely extending stop lugs formed integrally therewith at opposite edges thereof and bent at right angles to the plane of said plate and gaffs, a pivot pin extending through the gaffs and said slot in the trigger plate, and a spring normally urging the pointed ends of the gaffs toward each other and attached at its ends to the other ends of the gaffs, said gaffs having stop shoulders formed on the inner edges thereof between which the stop lugs on the trigger plate are shiftable by a sliding movement of the plate in one direction to hold the pointed ends of the gaff spaced apart against the action of said spring, said bait hook being located between the gaffs in a plane extending transversely of the pivotal axis of the gaffs.

4. In a trap hook, the combination of a pair of flat sheet metal gaffs arranged in crossed relation, a pivot pin extending through the gaffs at the point of intersection thereof, said gaffs being widened around the pivot pin, a flat sheet metal trigger plate having a widened upper end interposed between the widened portions of the gaffs and spacing their opposed faces apart, said plate having a longitudinal slot in its widened end through which the pivot pin extends whereby said plate may be shifted longitudinally transversely of the pivot pin, said slot and pin being so located that the upper end of the trigger plate is within the outer edges of the gaffs when the plate is moved upwardly, means connected with the upper ends of the gaffs for forcing the hooked lower ends thereof toward each other, a bait-hook attached to the lower end of the trigger plate toward and from which the gaffs move when rocked on their pivot, and a pair of lugs formed on said trigger plate and extending in opposite directions therefrom into the path of movement of different ones of the gaffs below the pivot pin, said gaffs each having a stop shoulder adjacent the pivot pin adapted to be engaged by one of the lugs when the trigger plate is moved upwardly to hold the lower hooked ends of the gaffs in spread relation, said lugs being adapted to be engaged by the inner edges of the gaffs below said stop shoulders when the plate is drawn downward to limit the inward swinging movement of the hooked ends of the gaffs.

5. In a device of the class set forth, the combination of a pair of crossed gaffs, a pivot pin extending through said gaffs at their point of intersection, said gaffs having inwardly turned gaff points at one end, a spring connecting the opposite ends of the gaffs normally tending to force the gripping ends of the gaffs toward each other, a flat sheet metal trigger plate interposed between the opposed faces of the gaffs around their point of pivotal connection the said trigger plate having a longitudinal slot through which said pivot pin extends and being provided with stop lugs formed integrally therewith at opposite edges and projecting transversely of the planes of the trigger plate and gaffs, said gaffs having stop shoulders formed on their inner edges between which the stop lugs on the trigger plate are shiftable by a sliding movement of the plate in a direction away from the gripping ends of the gaff whereby the said pointed ends are held spaced apart against the action of said spring, and a bait hook attached to the trigger plate and extending toward the gripping ends of the gaffs, the said gaffs around their pivotal connection contacting with the opposite faces of the trigger plate for a material portion of its area to brace and protect the said trigger plate.

6. In a device of the class set forth a pair of flat sheet metal gaffs having gripping ends, the said gaffs being overlapped at one point and widened at said point, a pivot pin extending through the gaffs at the said overlapping point, a spring tending to close the gaffs, a flat sheet metal trigger and locking plate interposed between the said opposed widened surfaces of the gaffs and formed with a longitudinal slot to receive the pivot pin, stops integral with the trigger plate at its opposite side edges, stops formed integrally with the gaffs and adapted to engage the stops on the trigger plate, the said trigger plate being slidable longitudinally to engage its stops with the said stops on the gaffs to hold the gaffs spaced apart, the stops on the gaffs being located at the edges of the widened portions of the gaffs and the opposed faces of said widened portions contacting with the opposite faces of the trigger plate whereby the trigger plate is braced for a substantial portion of its area adjacent the points of engagement of its stops with the stops upon the gaffs, and a bait hook attached to the trigger plate and extending toward the gripping ends of the gaffs.

In testimony whereof I hereunto affix my signature.

GEORGE H. DOERING.